Aug. 18, 1964     H. D. BAUMANN     3,144,879
ADJUSTABLE LAMINAR FLOW RESTRICTION
Filed March 12, 1963
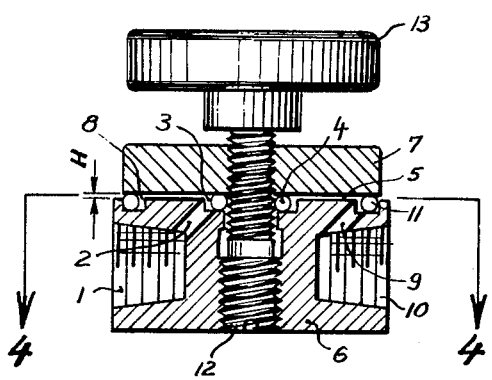
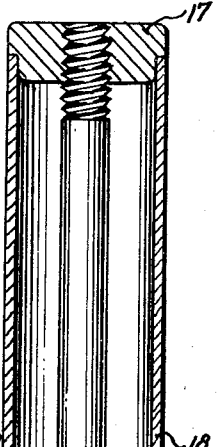
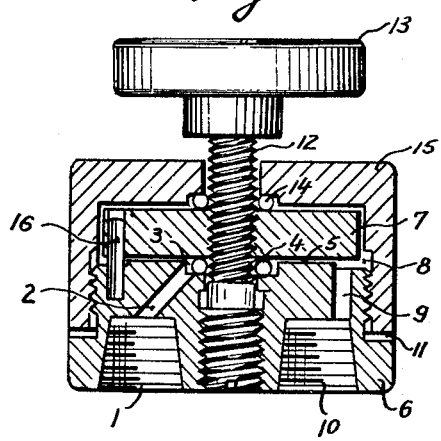
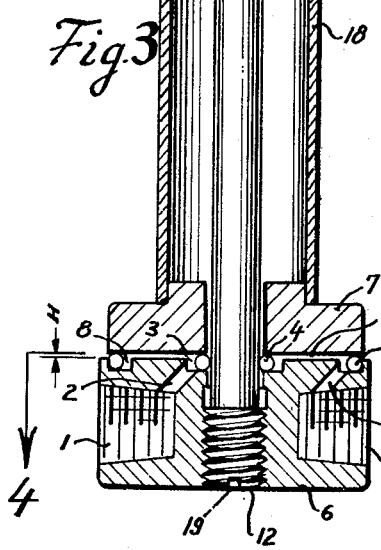
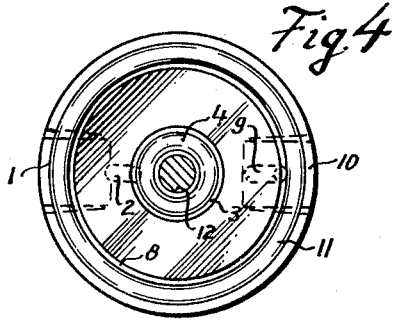
INVENTOR
Hans D. Baumann

United States Patent Office

3,144,879
Patented Aug. 18, 1964

3,144,879
ADJUSTABLE LAMINAR FLOW RESTRICTION
Hans D. Baumann, Sharon, Mass.
(203 Wayside Ave., Decatur, Ill.)
Filed Mar. 12, 1963, Ser. No. 264,544
3 Claims. (Cl. 138—43)

This invention relates to a device capable of restricting the flow of liquid or gaseous media by producing a laminar flow pattern, where the potential energy of the passing fluid is gradually reduced through viscous shear friction along a very narrow opening. The efficiency of such a device depends on the ability to offer as much wetted surface to the passing fluid as possible without necessitating an increase in flow area. This can be better understood by comparing my invention with a piece of tubing. The hydraulic diameter governing the Reynolds number and consequently the amount of fluid friction created in a typical restriction may be written as $$d = \frac{4A}{U}$$

where A is the flow area and U is the length of wetted surface surrounding the flow area in question. Then for a simple tube or orifice with $A=0.785$ the hydraulic diameter $d=1$. Assuming the identical flow area of $A=0.785$ and 1 as diameter of the inner flow cavity in my invention, $d$ is then calculated to be 0.5 or only half of that of a simple orifice by providing two wetted surfaces instead of one.

Further decrease in $d$ can be obtained by selection of a large internal diameter to flow area ratio which is not possible in orifices. Fine tapered needle valves have been used to provide laminar flow restrictions in the past, where the fluid is forced to pass between the outer wall of a tapered needle and the inner wall of a tapered orifice. However, it has been found that these valves tend to drift, that is, change their effective hydraulic diameter after some time which necessitates quite frequent recalibration. The mechanism of this drift is not completely understood but may be the result of some very minute changes in the plug position due to temperature effects or inherent mechanical stresses. It has been observed that very minute side movements of the plug will effectively change the hydraulic diameter of the valve and therefore its specific fluid resistance.

In my invention, which approaches a solid state device, any movement after initial adjustment is effectively prevented and in addition any side movement similar to the one of a valve plug would have no effect on the hydraulic diameter as will become apparent from the following detailed description. Extensive test showed even after months of service no need for recalibration of my invention, even with flow rates as low as 5 cc. per minute gas flow.

One typical application of my invention is measurement of flow rates. For laminar flow, the volumetric flow rate is directly proportional to the differential pressure. This means that this laminar flow restriction can be combined with a suitably calibrated differential pressure gage to perform the function of a linear flow meter. Present devices of this type employ a flow restriction consisting of narrow channels filled with glass fibres, which are satisfactory for this service. However, in order to increase or decrease the flow rate, a separate larger or smaller laminar flow restriction has to be attached to the flow meter. In addition, the initial calibration of such a typical flow restriction is rather difficult. My invention on the other hand, is adjustable, which eliminates the present calibration problem and in addition enables one to increase or decrease the specific fluid resistance by means of a calibrated dial, such providing for instance a flow meter for 0 to 10 cc./min.; 1 to 100 cc./min.; and 10 to 1000 cc./min. without having to replace a single component. Thus, one is able to select a specific scale without interruption or disconnection of the test loop.

If one would designate the distance between the two surfaces controlling the amount of fluid resistance as H, and the radial distance the fluid has to travel through as L, then the differential pressure necessary to pass a given mass flow M is $$\Delta p = \frac{kMLv}{H^3}$$

wherein $v$ is the kinematic viscosity of the fluid and $k$ is a dimensional constant. Thus adjusting H will change either the mass flow or the differential pressure by the third power ensuring a very wide rangeability for this device.

The distance H may be adjusted manually or the adjustment may be a function of the thermal expansion of a selected material as described later. The last modification cooperating with a second fixed resistance unit may be used as a telemetering thermometer, where the differential pressure across the thermal adjustment unit indicated on a calibrated scale of a pressure gage is a direct function of the local temperature.

Other noteworthy objections of my invention include the provision of a packless valve construction, that is, contrary to needle valves, no seals are in sliding contact with the outside means of adjustment commonly referred to as valve stem. Seals in my invention are of static type and therefore are not subject to wear regardless of the frequency of adjustment. Again in contrast to needle valves, the threaded means of adjustment may be of a special wear resisting material which does not have to be corrosion resistant and may be lubricated since it is not in contact with the fluid passing and being controlled.

Yet, still another object of my invention is the provision of a laminar flow restriction, which is rugged for long service life and which is easy and inexpensive to manufacture and which does not require matching of parts, hand lapping and other special production methods heretofore required by present devices performing similar functions.

These and other objections and advantages of my invention will best be understood from the following detailed description, when considered in conjunction with the annexed drawings, wherein—

FIG. 1 is a vertical, central, cross-sectional view, showing the structure and arrangements of parts of a manually adjustable type of my invention.

FIG. 2 shows a similar device modified to be pressure balanced, in a vertical, central, cross-sectional view.

FIG. 3 is a vertical, central, cross-sectional view of a temperature sensitive type of my invention.

FIG. 4 is a horizontal, cross-sectional view of FIGS. 1 and 3 respectively as indicated by arrows in said figures.

Referring now to the drawings in greater detail, fluid to be controlled enters my invention through ports 1 and 2 into a circular channel 3. An elastic circular seal, usually a rubber O-ring 4 is located towards the center of this channel and thus effectively blocks the escape of the fluid in this direction. The fluid can leave said channel only in radially outward direction through a narrow opening 5 formed between the upper surface of the main housing 6 and an adjustable plate 7. After passing said opening 5 the fluid is then collected in a second radial channel 8 and lead through a drilled hole 9 into outlet port 10. A second circular seal 11 prevents the fluid from leaking through the outer periphery of channel 8. Besides their sealing functions, seals 4 and 11 serve to store a certain compression load in order to elastically resist down movement of plate 7 and thus effectively eliminate backlash or lost motion in the adjusting screw 12. The latter secured to a hand wheel 13 in FIGS. 1 and 2 is threaded into housing 6 and with a different thread in plate 7. Through a predetermined difference in pitch between the larger and smaller threads, plate 7 is now effectively moved towards or away from housing 6 by a very small distance H, whenever the hand wheel 13 is turned. Thus turning hand wheel 13 provides fine manual adjustment of the laminar flow restriction as described before.

Whenever the invention is used for higher static pressures, then plate 7 should be hydrostatically balanced to prevent strain in adjusting screw 12 and therefore unvoluntary change in distance H. This may be accomplished by the modification shown in FIG. 2. Here, the fluid after being throttled through, surface 5 is free to move around and to the upper surface of plate 7, where its escape is prevented by a circular seal 14 having essentially the same dimensions as seal 4. A cover or bonnet 15 provides a metallic enclosure of the total fluid system. Since both, the upper and lower surface area of plate 7, are equally subjected to the fluid pressure, no hydrostatic load due to change in static fluid pressure is transmitted to the adjusting screw 12. A pin 16 prevents plate 7 from turning during manual adjustment.

As indicated before, the difference in thermal expansion between two dissimilar metal parts may be employed to automatically adjust said throttling distance H as a function of the local temperature. A typical example of such a design is illustrated in FIG. 3. Here adjusting screw 12 is made of a material having essentially no thermal expansion such as a 36% nickel-64% iron alloy. Said adjusting screw is secured to the housing 6 on one side and to a flange 17 at the opposite end, thus clamping a tubular member 18 made from a material possessing a high thermal expansion coefficient such as aluminum between plate 7 and flange 17. Any increase in temperature will cause an expansion of tube 18 thereby forcing plate 7 towards housing 6 and effectively reducing distance H or the flow area. By suitably combining a device shown in FIG. 1 with the one in FIG. 3, a telemetering thermometer can be provided. This is done by supplying a constant fluid pressure into port 1 of FIG. 1 and by connecting the output port 10 of FIG. 1 to the input port 1 of FIG. 3. Port 10 in FIG. 3 may be open to atmospheric discharge. By then measuring the pressure level at outlet port 10 of FIG. 1, a direct and linear reading of the local temperature surrounding FIG. 3 can be made. The setpoint for such a device can be calibrated by adjusting hand wheel 13 in FIG. 1, while the scale range for the temperature readings can best be adjusted through turning screw 12 by means of a screw driver slot 19 in FIG. 3. This way a specific fluid resistance for a given temperature level can be provided by merely changing the initial distance H in the latter device.

It may be understood that even though the illustrations show the invention in a basic form, numerous changes in design are possible without departing from the spirit of my invention. Thus it will be obvious to the one skilled in the art that FIG. 1 and FIG. 3 for example can be combined in such a manner that the lower surface of housing 6 in FIG. 3 can cooperate with plate 7, screw 12, and hand wheel 13 of FIG. 1 or 2. It is also possible to attach a second plate 7 to the underside of housing 6 of FIG. 1 with the larger threaded section of adjusting screw 12 cooperating with this plate instead of housing 6, thus providing with the aid of suitable porting and seals two "in series" acting fluid resistance devices. For high temperature service seals 4, 11 and 14 may be made out of metal. It may also be pointed out, that a pneumatic, hydraulic or electrical actuating device may be attached to stem 12, in order to provide motorized adjustment if so desired. A further modification can provide coating the throttling surface of plate 7 with a thin coat of a suitable elastomer, in order to provide tight shut-off, when plate 7 is in contact with housing 6.

Having thus clearly shown and described the invention, what is claimed as new and desired to secure by Letters Patent is:

1. Apparatus for controllably restricting the flow of fluid therethrough which comprises a housing having a flat upper surface and having an opening to receive a screw or valve stem centrally of said upper surface and extending into the housing, said housing also being provided with a circular channel disposed substantially co-radially and in apposition with said screw opening and communicating with the upper flat surface, said housing being further provided with an opening through one of its surfaces other than the upper flat surface and extending into the housing to provide for ingress of fluid and said housing being also provided with another opening through one of its surfaces other than its upper flat surface to provide for egress of fluid therefrom, said housing being provided with a port to connect the inlet opening to the circular channel and flat upper surface of the housing substantially centrally of said surface, said housing being provided with a second port which connects the fluid egress opening with the flat upper surface at a substantially greater radial distance from the center of said flat upper surface than the inlet port connection thereto; a flat plate held above and in opposition to the flat upper surface of the housing, said plate being provided with an opening which is co-radially of the screw opening of the housing; a sealing ring located in the central channel of the housing having an opening which is in co-radial relationship with the screw opening of the housing, said sealing ring providing a bearing surface for the aforementioned flat plate and providing means for displacing the plate from the housing; means for sealing the periphery of the housing and the periphery of the plate against leakage of fluid therethrough; and, screw or valve stem means extending through the openings in the flat plate, the sealing rings and housing and screwably engaging the same to regulate the spacing apart of the flat plate and housing, said screw means including a differentially pitched threaded section to engage the housing and the flat plate.

2. The apparatus of claim 1 wherein the means for sealing the periphery consists of a bonnet which encompasses the flat plate and is secured to the housing and wherein the screw means extends through said bonnet, and a flat plate or housing to hold the same in regulatably cooperative relationship.

3. The apparatus of claim 2 wherein the outlet port communicates with the upper side of the flat plate as well as the means for egress and wherein a second sealing ring is provided between the upper side of the flat plate and the bonnet to prevent leakage.

References Cited in the file of this patent

UNITED STATES PATENTS

| | | |
|---|---|---|
| 1,964,300 | Perry et al. | June 26, 1934 |
| 1,983,213 | Brady et al. | Dec. 4, 1934 |
| 2,840,096 | Du Bois | June 24, 1958 |
| 3,100,509 | Bialkowski | Aug. 13, 1963 |